United States Patent [19]
Enomoto

[11] Patent Number: 5,381,980
[45] Date of Patent: Jan. 17, 1995

[54] LIGHT SHIELDING CONTAINER FOR PHOTO-SENSITIVE MATERIAL

[75] Inventor: Masahiro Enomoto, Kanagawa, Japan

[73] Assignee: Fuji Photo Film Co., Ltd., Kanagawa, Japan

[21] Appl. No.: 68,081

[22] Filed: May 28, 1993

[30] Foreign Application Priority Data

Jun. 2, 1992 [JP] Japan .................................. 4-141759

[51] Int. Cl.⁶ .............................................. G03B 17/26
[52] U.S. Cl. ................................................. 242/348.4
[58] Field of Search ................... 242/71, 71.1, 71.7, 242/348.4; 354/275

[56] References Cited

U.S. PATENT DOCUMENTS

| | | | |
|---|---|---|---|
| 3,945,584 | 3/1976 | Mangan | 242/71.1 |
| 3,993,488 | 11/1976 | Oishi | 354/304 X |
| 4,834,306 | 5/1989 | Robertson et al. | 242/71.1 |
| 5,188,789 | 2/1993 | Nishiura | 264/171 |
| 5,211,348 | 5/1993 | Enomoto | 242/71.1 |
| 5,250,404 | 10/1993 | Sakakibara | 264/171 X |

FOREIGN PATENT DOCUMENTS

| | | |
|---|---|---|
| 2124564 | 5/1990 | Japan . |
| 4-343354 | 11/1992 | Japan .................... 242/71.1 |
| PCT/US890-2519 | 6/1989 | WIPO . |

Primary Examiner—Daniel P. Stodola
Assistant Examiner—John P. Darling
Attorney, Agent, or Firm—Sughrue, Mion, Zinn, Macpeak & Seas

[57] ABSTRACT

A container for containing a photosensitive material such as a cassette shell of a photographic film cassette, in which a roll of photographic film wound on a spool is contained in the cassette shell. The cassette shell is formed from a resin material by molding to have a satisfying light imperviousness and a surface color that is gray rather than black. The resin material is loaded with not more than 2% additive agent consisting of carbon black and titanium oxide. The weight percentage of the titanium oxide is equal to or more than that of the carbon black. The thickness of walls of the cassette shell is not less than 0.5 mm.

17 Claims, 3 Drawing Sheets

LIGHT SHIELDING CONTAINER FOR PHOTO-SENSITIVE MATERIAL

BACKGROUND OF THE INVENTION

1. Field of the Invention

The present invention relates to a container for containing a photosensitive material, such as photographic film or photographic printing paper, in light-tight fashion. In particular, the invention is a container for photosensitive material which has good light shielding characteristics and high strength. The present disclosure is based upon the disclosure of Japanese Appln. No. 4-141759 filed Jun. 2, 1992, which disclosure is incorporated herein by reference.

2. Description of the Related Art

Photographic film and photographic printing paper are contained in light-tight containers, because of the photosensitivity thereof. For example, in the known 135-size (35 mm) photographic film cassette, a photographic filmstrip wound on a spool is contained in a container made of a metal plate, and the container is used to house the film for photographing as well as for storage.

Recently, it is known to utilize a photographic film cassette in which a filmstrip, including a leader portion thereof, is entirely located within a cassette shell when the film cassette is not used. Such a cassette has a mechanism for advancing a leading end of the filmstrip to the outside of the cassette shell by rotating a spool of the cassette in an unwinding direction. This configuration makes the cassette easy to handle, because the leading end of the filmstrip does not extend outside the cassette shell when the cassette is loaded into and removed from a camera. For the same reason, this type of cassette is favorable for its light-shielding ability.

Specifically, U.S. Pat. No. 4,834,306 and Japanese Laid-open Patent Application No. 2-124564 each disclose a film cassette of the leader advancing type wherein a spool is provided with disks or flanges on both lateral sides of a film roll would on the spool. Circumferential or annular lips are formed on the periphery of the flanges to project in the axial direction of the spool so that the outermost convolution of the film roll is radially constrained by the lips. Ridges are formed on the lateral walls of the cassette shell for contact with the outside surface of the flanges, and press the flanges against the lateral sides of the film roll. Accordingly, the film roll is rotated together with the spool.

Spreader or guide projections are formed on the inside of the cassette shell at a position which is proximate a film passageway through which a leading end of the filmstrip is advanced to the outside of the cassette shell. The spreaders deflect the flanges outwardly to widen the spacings between the flanges, at positions thereof which are proximate the passageway, to prevent the outermost convolution of the film roll from contacting with the lips in the vicinity of the spreaders.

The cassette shell is provided with a separating claw disposed in a position corresponding to one of the spreaders. The separating claw is adapted to peel off the leading end of the filmstrip from the inner roll and guide it to the outside of the cassette shell through the film passageway when the leading end is freed form the radial confinement of the lips in the vicinity of the spreaders.

The spool, including the flanges, is made of resin. Also the cassette shell is composed of two shell halves produced by resin molding. The shell halves must be light-tight, and must be integrally formed with the spreaders, the separating claw and the ridges which are necessary for the above-described leader-advancing function.

In view of the foregoing, it is important to select an optimum composition of the resin material of the cassette shells in view of moldability as well as light shielding characteristics because light shielding is an essential function of cassette shells, and moldability greatly affects the efficiency of manufacturing of the cassette shells.

If cassette shells only require light shielding ability, they can be formed from any black resin material which is used to form the spools of the conventional film cassettes. However, the carbon content of conventional black resin material is so large that a product molded therefrom will be considerably weak when formed to a small thickness, as is required for cassette shells, (e.g., less than 1.0 mm). On the other hand, as the thickness of resin molded products increases, the cooling time generally increases in the molding process. A long cooling time not only extends the molding cycle, but also may often cause the products to incur sink marks.

Furthermore, because the photographic film of the film cassette is always used with the cassette shell, it is desirable to print information relating to the film on the cassette shell, and to make the appearance of the cassette shell attractive. Therefore, conventional cassette shells have information, marks or decorative patterns printed thereon. However, if the outer surface of the cassette shell is black it is difficult to clearly provide information or decorative patterns on the cassette shell without the use of an additional label, or the like.

SUMMARY OF THE INVENTION

The present invention is made to solve the above-described problem. Therefore, an object of the invention is to provide a container for a photographic material, which is molded form a resin material which is not black but still exhibits sufficient light shielding capability. The resin material is also superior in moldability and suitable for ultrasonic welding. Also, mechanical strength of the cassette is high even when the thickness of the container wall is small.

To achieve the above and other objects and other advantages, the present invention determines the composition of the resin material of the container such that the light imperviousness value T of the resin material is not less than 0.8, wherein $T = t \times D$, t represents wall thickness of the container, and D represents optical density of the container at a wall thickness of 0.1 mm. The resin material of the invention contains not more than 2% additive agent by weight. The additive agent consists of titanium oxide and carbon black, wherein the content of titanium oxide is 50% or more, and the content of carbon black is 50% or less.

According to a preferred embodiment of the invention, the minimum thickness of the container wall is not less than 0.5 mm, for ensuring reliable light-shielding characteristics.

The present invention is applicable not only to film cassettes, but also any other type of light-tight container for containing a photosensitive material, including negative, positive and reversal photographic films, and photographic paper.

BRIEF DESCRIPTION OF THE DRAWINGS

Other objects and advantages of the present invention will become apparent in the following detailed description of the preferred embodiment when read in connection with the accompanying drawings, wherein.

DETAILED DESCRIPTION OF THE PREFERRED EMBODIMENT

Figure 1:
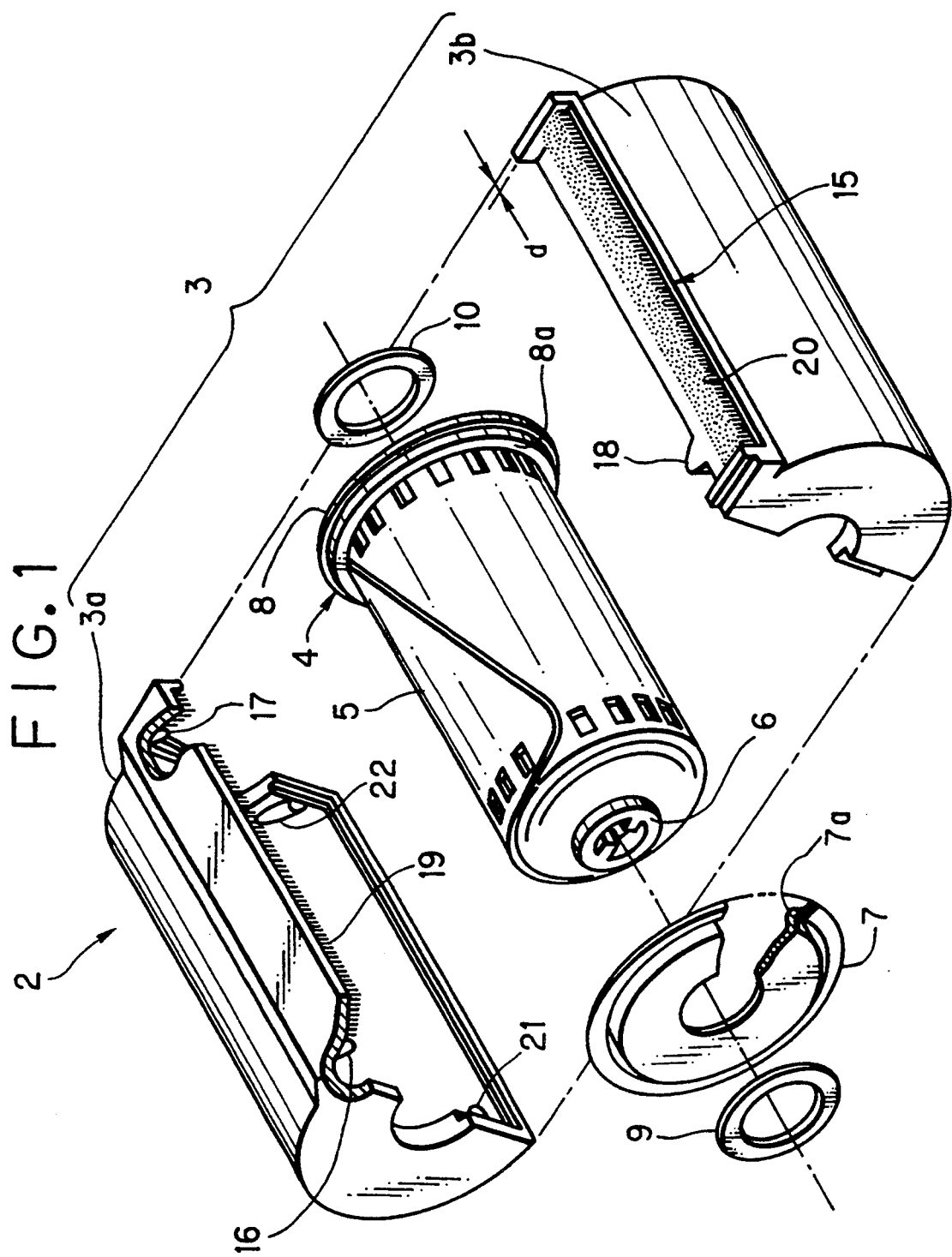
FIG. 1 is an exploded perspective view of the film cassette of the leader-advancing type according to a embodiment of the invention.

A photographic film cassette of the leader-advancing type of the preferred embodiment is shown in FIG. 1. The film cassette 2 includes a cassette shell 3 which is constituted of two shell halves 3a and 3b. The shell halves 3a and 3b are respectively molded form resin, and are joined to each other by ultrasonic welding. The cassette 2 also includes a spool 4 mounted in the cassette shell 3, and a photographic filmstrip 5 wound in a roll on the spool. The spool 4 has a core 6 and a pair of disks of flanges 7 and 8, the spool core 6 has rings 9 and 10 fitted thereon for preventing the flanges 7 and 8 from sliding off the ends of the spool core 6.

The flanges 7 and 8 are produced by vacuum forming a sheet of resin material having a thickness of about 0.3 mm, and are thus very flexible. Annular lips 7a and 8a are formed integrally on the flanges 7 and 8. The lips 7a and 8a circumferentially extend from the flanges 7 and 8 to radially confine the outermost convolution of the roll of filmstrip 5 at both lateral sides of the filmstrip 5. In this way, the roll of filmstrip 5 wound on the spool core 6 is prevented from loosening. Therefore, the roll of filmstrip 5 is rotated together with the flanges 7 and 8 when the spool core 6 is rotated in a clockwise direction in FIG. 1.

A photographic film passageway 14, for passing the filmstrip 5 therethrough, is defined between the shell halves 3a and 3b. A pair of guide projections or spreaders 16 and 17 are formed on shell half 3a in correspondence with the passageway 15 to contact with the inner walls of the flanges 7 and 8 and deflect opposite positions of the annular lips 7a and 8a axially away from each other to define an axial dimension therebetween which slightly exceeds the film width. Therefore, in the vicinity of the spreaders 16 and 17, the flanges 7 and 8 are axially spaced by the spreaders 16 and 17 to a sufficient degree to prevent the lips 7a and 8a from radially confining the outermost convolution of the roll of filmstrip 5 at positions near the passageway 15.

A separating claw 18 is formed on shell half 3b to peel off the leading end of the filmstrip 5 the inner roll and guide it to the outside of the cassette shell 3 through the film passageway 15 when the leading end of the filmstrip 5 is freed form the radial confinement of the two lips 7a and 8a in the vicinity of the two spreaders 16 and 17. Plush, or light-trapping fabric pieces, 19 and 20 are attached to the shell halved 3a and 3b at opposite portions thereof which define the film passageway 15, in order to prevent ambient light from entering the inside of the cassette shell 3 through the film passageway 16. Ridges 21 and 22 are formed on the lateral walls of the shell half 3a for contact with the outside surface of the flanges 7 and 8. The ridges 21 and 22 press the flanges 7 and 8 against the end faces of the roll of filmstrip 5.

When the film cassette 2 is loaded in a camera, the spool core 6 is rotated by an initial advance mechanism of the camera (not illustrated) in an unwinding direction to unwind and advance the filmstrip 5, i.e., the clockwise direction in the drawings. The flanges 7 and 8 are pressed by the ridges 21 and 22 against the end faces of the roll, and thus the lateral sides of the outermost convolution of the roll are in contact with and confined by the lips 7a and 8a. Accordingly, the roll is rotated together with the spool core 6, without being unwound.

However, in the vicinity of the spreaders 16 and 17, the flanges 7 and 8 are spread apart in the axial direction by the spreaders 16 an 17 to free the outermost convolution of the roll of the filmstrip 5 from the radial confinement of the lips 7a and 8a. Therefore, when the leading end of the filmstrip 5 is brought into contact with the separating claw 18 during the rotation of the spool core 6, the separating claw 18 peels off the leading end from the inner roll of the filmstrip 5. Further rotation of the spool core 6 causes the leading end of the filmstrip to slide on the upper surface of the separating claw 18 and advance to the outside of the cassette shell 3 through the film passageway 15.

After all of the frames of the filmstrip 5 have been exposed, the spool core 6 is rotated counterclockwise by the advance mechanism of the camera, thereby to rewind the exposed film into the cassette shell. The filmstrip 5 is wound on the spool core 6 while the lateral sides of the filmstrip 5 are guided by the flanges 7 and 8. When the entire length of the exposed filmstrip 5 has been rewound into the cassette shell 3, the lips 7a and 8a once again radially confine the outermost convolution of the roll of exposed filmstrip 5. In this way, the exposed filmstrip 5 can be stored in the cassette shell 3 in the same condition as before exposure. It is possible to once again advance the exposed filmstrip 5 to the outside of the cassette shell 3 by rotating the spool core 6 in the unwinding direction, for development and printing by an automatic photo-processor, for example.

The shell halves 3a and 3b are formed from a resin material by injection molding. A base material of the resin material is high-impact polystyrene (HIPS) resin containing additional components such as an antioxidant and silicone. Also, the base material is mixed with an additive agent which consists of carbon black and titanium oxide. The carbon black, hereinafter referred to simply as carbon, imparts light shielding characteristics to the shell halves 3a and 3b, and the titanium oxide imparts a gray surface color to the shell halves, rather than black. The carbon and titanium oxide content of the resin material is determined as set forth below.

Figure 2:
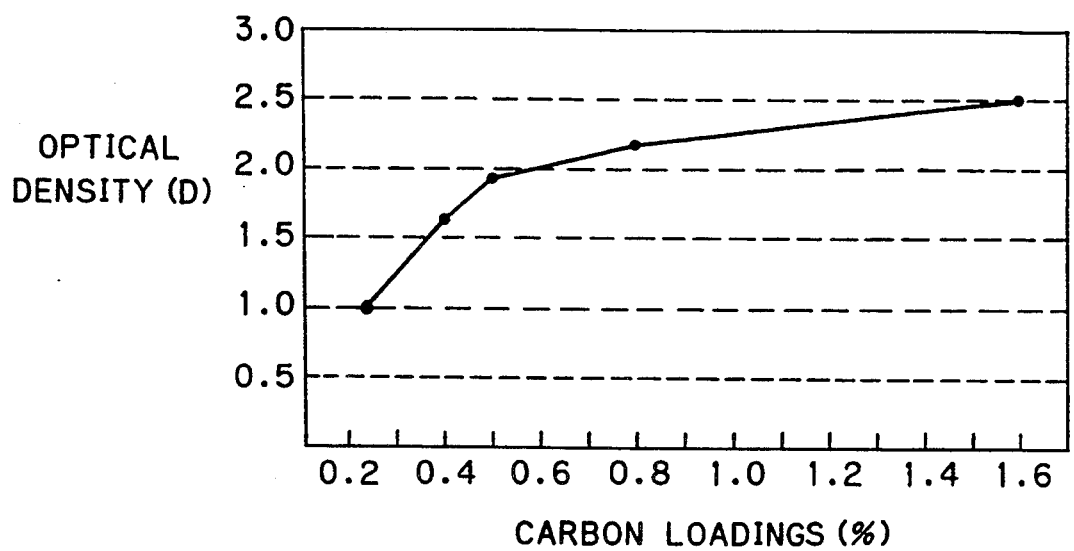
FIG. 2 is a graph illustrating the relationship between carbon content and optical density of resin molded products.

FIG. 2 illustrates experimental results of the relationship between optical density D and carbon loading (wt %), wherein the optical densities of five different kinds of test samples were measured using a spectrometer, "FUJI FSD-103 (a trade mark)", with a filter R at a wave length of 600 nm. The test samples were respectively molded from five resin materials of different carbon loadings, and were hot-pressed into 0.1 mm thick sheets. As shown in FIG. 2, the increase in optical density is minimal above 0.8% by weight carbon loading.

Wall thickness of resin molded products is another factor affecting light shielding characteristics of the final products. Table 1 shows the results of a light imperviousness test. Test pieces of 0.3, 0.5 and 0.7 mm thick were formed from each of the five different carbon loading resin materials, whose optical densities were respectively "1.0", "1.6", "1.9", "2.2", "2.5" in the form of a sheet of 0.1 mm thick. ISO 400 photographic film, "FUJI: SHG400 (a trade mark)", shielded with each of the fifteen test pieces was exposed to light of 100,000 lux for 5 minutes. After development, the films were visually inspected for fogging. In table 1, "OK" means that the film shielded with the corresponding test piece was determined to be unexposed, while "NG" means that the film shielded with the corresponding test piece had some exposed portions (fogging).

TABLE 1

| Carbon Loading (%) | | 0.25 | 0.4 | 0.5 | 0.8 | 1.6 |
|---|---|---|---|---|---|---|
| Optical Density (D) | | 1 | 1.6 | 1.9 | 2.2 | 2.5 |
| Thickness (t) mm | 0.3 | NG | NG | NG | NG | NG |
| | 0.5 | NG | OK | OK | OK | OK |
| | 0.7 | NG | OK | OK | OK | OK |

Figure 3:
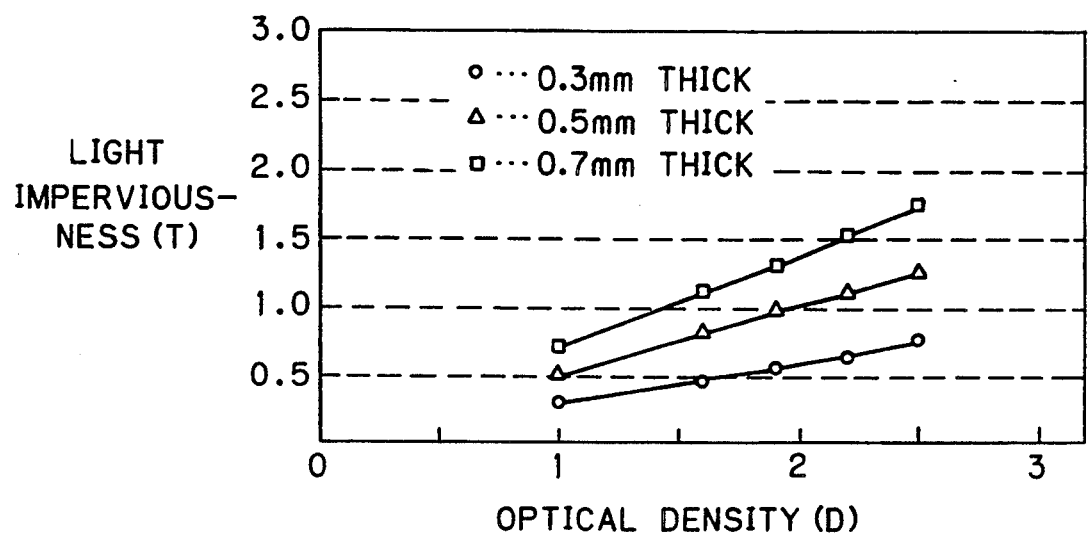
FIG. 3 is a graph illustrating the relationship between optical density and light imperviousness of resin molded products in correspondence with Table 2.

According to the experimental results shown in Table 1, at least 0.4% carbon loading, that means an optical density of 1.6 or more, is necessary when the wall thickness is not more than 0.7 mm. Furthermore, it was found that the wall thickness must be not less than 0.5 mm if the carbon loading is not more than 1.6%. Because light imperviousness depends on both the optical density and the wall thickness, a light imperviousness value T can be calculated according to the following equation:

$$T = t \times D$$

wherein t is the wall thickness, and D is the optical density. Table 2 shows the calculated light imperviousness values T of the best pieces in correspondence with Table 1. FIG. 3 is a graph corresponding to Table 2.

TABLE 2

| Light Imperviousness T = t × D | | | | | | |
|---|---|---|---|---|---|---|
| | | Optical Density (D) | | | | |
| | | 1 | 1.6 | 1.9 | 2.2 | 2.5 |
| Thickness (t) mm | 0.3 | 0.3 | 0.48 | 0.57 | 0.66 | 0.75 |
| | 0.5 | 0.5 | 0.8 | 0.95 | 1.1 | 1.25 |
| | 0.7 | 0.7 | 1.12 | 1.33 | 1.54 | 1.75 |

Comparing the calculated values of Table 2 with the experimental results of Table 1, Applicants have concluded that the light imperviousness T of the cassette shell must be 0.8 or more.

Figure 4:
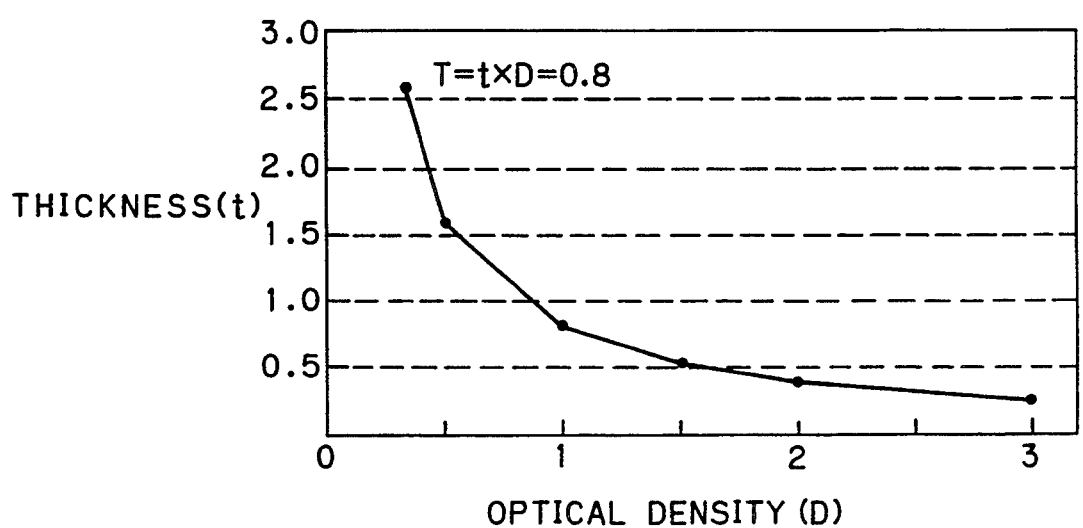
FIG. 4 is a graph illustrating the relationship between optical density and wall thickness at a light imperviousness value of T=0.8.

The relationship between the wall thickness t and the optical density D at a light imperviousness value T=0.8 can be represented by a curve as shown FIG. 4.

In order to form a resin product by injection molding, the wall thickness t of the product must be at least 0.4 mm. If the wall thickness t is less than 0.4 mm, the flow resistance of the resin material flowing through a mold becomes so large that the frequency of short shot, i.e. incomplete mold filling, will increase. On the other hand, if the wall thickness t is more than 2 mm, the necessary cooling time is so long that sink marks tend to form in the molded products.

Consequently, in view of light shielding capability and moldability, it is preferable to form the cassette shell 3 from a resin material whose light imperviousness T is 0.8 or more when the wall thickness is in a range from 0.4 mm to 2.0 mm.

It is possible to improve the light imperviousness by making the optical density of the resin material higher. However, it is unfavorable to set the optical density at 2.3 or more, because a carbon loading of more than 0.8% is required to achieve such a large optical density. Such an increase in carbon loading will yield a molded product having a black surface. Also, when loading carbon in the base resin material, it is necessary to add a dispersant for avoiding flocculation of the carbon. Therefore, the required content of the dispersant also increases with the increase in carbon loading. The dispersant further lowers the mechanical strength of the resin material. For this reason, it is important to carefully select the type and amount of carbon and dispersant.

According to WO publication No. 89/12847, carbon usually contains cyanogen compound. It is known that cyanogen compound chemically interacts with the photographic film to cause adverse results. In view of this, a large content of cyanogen compound has a bad influence on the photographic properties of the photographic film. The allowable content of cyanogen compound, below which the photographic film is not considerably affected by the cyanogen compound, depends on the amount of the carbon, but is generally 3 ppm per carbon weight, wherein the cyanogen compound content in carbon is measured as follows:

Hydrogen cyanide, which is generated when the carbon is refluxed with the presence of sulfuric acid, is trapped by 0.1N aqueous sodium hydroxide. Thereafter, the amount of the hydrogen cyanide is determined by 4-pyridine-carboxylic acid spectrophotometry, and is converted into the units of ppm per carbon weight.

Cyanogen compound content in carbon is known to correlate with DBP (dibutyl peroxide) oil absorption of the carbon. Carbon whose DBP oil absorption is less than 65 ml/100 g contains a large enough amount of cyanogen compound to adversely affect photographic film. Also, the ash content of a carbon is 0.5% or more, the cyanogen compound content of the carbon is high enough to damage photographic film.

Therefore, carbon desirable for use in the present invention should have a DBP oil absorption of 65 ml/100 g or more, or the ash content thereof should be 0.5% or more, or the cyanogen compound content thereof should be 2 ppm per carbon weight at most. For example, carbon blacks sold under the trade names CB#950, CB#45(B), CB#41(B), CB#(40)B and CB#30(B), which are produced by Mitsubishi Chemical Industries, Ltd., are preferably used as such carbon. These carbon blacks can be mixed with PE, PP, PS, AS, ABS, PC, PPO (including modified PPO), PA, POM, PET, PBT and PVC resins.

The content of additive agent, a mixture of carbon and titanium oxide, in the resin material is preferably 2 wt % or less, and favorably not more than 1.5 wt %. This is because the components of the additive agent separate out of the mold during molding, if more than 2 wt % additive agent is loaded in the resin material. As a result, the surface of the molded product may be stained, or the air vent of the mold become clogged which causes the molded product to be burnt or short shot.

As described above, titanium oxide in the additive agent is used for whitening the surface color of the resin molded product. The whiteness of the surface color increases with an increase in the titanium oxide percentage in the additive agent, and the blackness of the surface color increases with an increase in the carbon percentage in the additive agent. Table 3 shown the relationship between the surface color and the carbon titanium oxide mixing ratio.

TABLE 3

| Titanium Oxide (%) | 90 | 70 | 50 | 30 | 0 |
|---|---|---|---|---|---|
| Carbon (%) | 10 | 30 | 50 | 70 | 100 |
| Visual Color | gray | gray | dark gray | black | black |

As shown in Table 3, in order to make the surface color gray rather than black, the additive agent must contain at least 50% titanium oxide. It was found that, when the base material was mixed with 1 wt % additive agent containing 50% carbon and 50% titanium oxide, the optical density D of the consequent resin product was 1.1 Accordingly, when forming the cassette shell 3 from this resin material, the wall thickness t must be at least 0.72 mm, and preferably 0.86 mm or more, in order to achieve the desire light imperviousness T of 0.8 or more.

An Izod impact test and a tensile strength test were performed using shell halves which were formed from five different kinds of resin materials. Each kind of resin material contains 1 wt % additive agent consisting of carbon and titanium oxide, in various proportions as shown in Table 4. The tensile strength test was performed after ultrasonic welding of the same kind of shell halves into individual cassette shells. Also the coefficient of static friction between each cassette shell and an individual photographic filmstrip was measured (this is indicative of how readily film can be advanced from the cassette shell).

Table 4 shows the results of the tests and the measurement, wherein the Izod impact strength, the tensile strength and the coefficient of static friction of each sample are shown as relative values with respect to those of a reference sample which contains no additive agent and is assumed to have an Izod impact strength, tensile strength and coefficient of static friction of which are all equal to "1".

TABLE 4

| Titanium Oxide Content (%) | 90 | 70 | 50 | 30 | 0 | 0 |
|---|---|---|---|---|---|---|
| Carbon Content (%) | 10 | 30 | 50 | 70 | 100 | 0 |
| Izod Impact Strength | 0.5 | 0.7 | 1.6 | 1.2 | 1.0 | 1 (0.4 kg/cm) |
| Tensile Strength | 1.9 | 1.7 | 1.6 | 1.2 | 1.0 | 1 (15 kg) |
| Coefficient of Static Friction | 0.80 | 0.85 | 0.95 | 1 | 1 | 1 |

A shown in Table 4, the Izod impact strength decreases with an increase in titanium oxide relative to carbon, but on the contrary, the tensile strength of the welded cassette shells increases along with the proportion of titanium oxide. The increase in the tensile strength means that the resin molded product effectively transmitted vibration from an ultrasonic horn to an energy director disposed at a welding portion of the product. This means that the suitability for ultrasonic welding improved with the increase in titanium oxide content. Also, the coefficient of static friction decreases with the increase in the titanium oxide content. This is because the titanium oxide rising to the surface of the molded product improves the smoothness of the surface.

From the results shown in Tables 3 and 4, in order to form a cassette shell having a gray surface color, it is preferable to load the base material, that is, the high impact PS resin material, with 1 wt % additive agent consisting of carbon and titanium oxide and having a carbon-titanium oxide mixing ratio of 3:7. It was found that the optical density D of the consequent resin product is 0.95. Accordingly, by forming the shell halves 3a and 3b with a minimum wall thickness d of 0.9 mm and an average wall thickness of 1.2 mm, desirable light shielding characteristics (T =0.85 or more) were achieved. Also, a sufficient dimensional precision was maintained in the cassette. Furthermore, short shot and adhesion of the resin material to the mold were not detected in testing. The molding cycle was less than 15 seconds. The surface color was relatively light gray. Because the coefficient of static friction between the cassette shell 3 and the filmstrip was reduced, the torque applied to the spool core 6 for advancing the leading end 5 can be effectively reduced. The strength of the cassette was not diminished by the ultrasonic welding.

As described above, the cassette shell 3 of the preferred embodiment has a light imperviousness value T of not less than 0.8, preferable 0.95 or more, wherein $T = t \times D$, t is wall thickness, and D is the optical density. The loading of the additive agent in the resin material of the cassette shell 3 is not more than 2%, preferably not more than 1.5%, and favorably 1% by weight. The titanium oxide percentage in the additive agent is 50% or more, and preferably 70% by weight. Carbon loading in the resin material is preferably not more than 0.8%. The wall thickness t of the cassette shell 3 is not less than 0.5 mm, preferably not less than 0.72 mm and less than 2 mm, and favorably not less than 0.86 mm and less than 2 mm.

In order to prevent cyanogen compound contained in carbon from affecting the photographic properties of the photographic film, carbon having a DBP oil absorption of not less than 65 ml/100 g and ash content of not more than 0.5% is desirable for use in the resin material.

The cassette shell 3 according to the preferred embodiment is superior in light shielding characteristics moldability, and has a surface color that is gray rather than black. Moreover, because the carbon loading necessary for the satisfying light imperviousness can be reduced, the cassette shell 3 has a high mechanical strength, and has no considerable chemical influence on the photographic properties of the photographic film contained in the cassette shell 3.

Although the present invention has been described with reference to a preferred embodiment shown in the drawings, the present invention is not limited to the embodiment. On the contrary, the present invention is applicable to any type of known cassette or container and is limited only by the scope of the appended claims. For example, the invention applies to a film cassette wherein ribs are formed on the inner walls of cassette shell halves, for preventing the loosening of the film roll, or to a film cassette wherein flanges are formed integrally with a spool core to contact both lateral sides of the film roll to prevent loosening of the film roll.

The present invention is also applicable to various types of containers for containing photosensitive materials in light-tight fashion with or without a spool.

What is claimed is:

1. A container for containing a photosensitive material comprising:
   a shell formed from a resin material and having a light imperviousness value T of not less than 0.8, wherein $T = t \times D$, t is a wall thickness of said container expressed in units, and D is the optical density per unit thickness of said container, said resin material having an additive agent loaded therein, the amount of said additive agent being 2% or less by weight, said additive agent comprising carbon black and titanium oxide and having a weight percentage of said titanium oxide which is at least equal to a weight percentage of said carbon black.

2. A container as recited in claim 1, further comprising:
   photographic film disposed in said shell.

3. A container as recited in claim 2, further comprising:
   a spool disposed in said shell, said film being disposed on said spool in the form of a roll.

4. A container as recited in claim 3, wherein said shell comprises two molded shell halves which are joined to each other by ultrasonic welding.

5. A container as recited in claim 4, wherein a leading end of said photographic film roll wound on said spool is entirely located inside said shell, said container further comprising means for causing said leading end to advance to the outside of said cassette shell through film passageway by rotating said spool.

6. A container as recited in claim 5, wherein said carbon black has a dibutyl peroxide oil absorption of not less than 65 ml/100 g and an ash content of 0.5% or less.

7. A container as recited in claim 5, wherein said wall thickness is at least 0.5 mm.

8. A container as recited in claim 7, wherein the loading of said additive agent in said resin material is 1.5% or less by weight.

9. A container as recited in claim 8, wherein the loading of said additive agent in said resin material is 1% by weight.

10. A container as recited in claim 7, wherein the ratio of said carbon black to said titanium oxide in said additive agent is 3:7 by weight.

11. A container as recited in claim 10, wherein the content of said carbon black in said resin material is 0.8% or less by weight.

12. A container as recited in claim 7, wherein said wall thickness t is at least 0.72 m and less than 2 mm.

13. A container as recited in claim 12, wherein said wall thickness t is at least 0.86 mm.

14. A container as recited in claim 7, wherein said resin material further comprises a base material consisting of a high impact polystyrene resin material.

15. A method for manufacturing a film cassette having a cassette shell, a spool rotatably mounted in said cassette shell and a roll of photographic film wound on said spool, wherein a leading end of said photographic film roll is entirely located inside said cassette shell and may be advanced to the outside of said cassette shell through a film passageway by rotating said spool, said method comprising the steps of:
   mixing a base material with 2% or less additive agent to compose a resin material, said additive agent comprising carbon black and titanium oxide and having a weight percentage of said titanium oxide which is at least equal to a weight percentage of said carbon black;
   forming said cassette shell from said resin material, by molding, to have a light imperviousness value T at least 0.8, wherein $T = t \times D$, t is wall thickness of said cassette shell, and D is the optical density per unit thickness of said cassette shell.

16. A method of manufacturing a film cassette as recited in claim 15, wherein said cassette shell has a wall thickness t of at least 0.5 mm.

17. A method of manufacturing a film cassette as recited in claim 15, wherein said carbon black has a dibutyl peroxide oil absorption of at least 65 ml/100 g and an ash content of 0.5% or less.

* * * * *